Patented Jan. 6, 1931

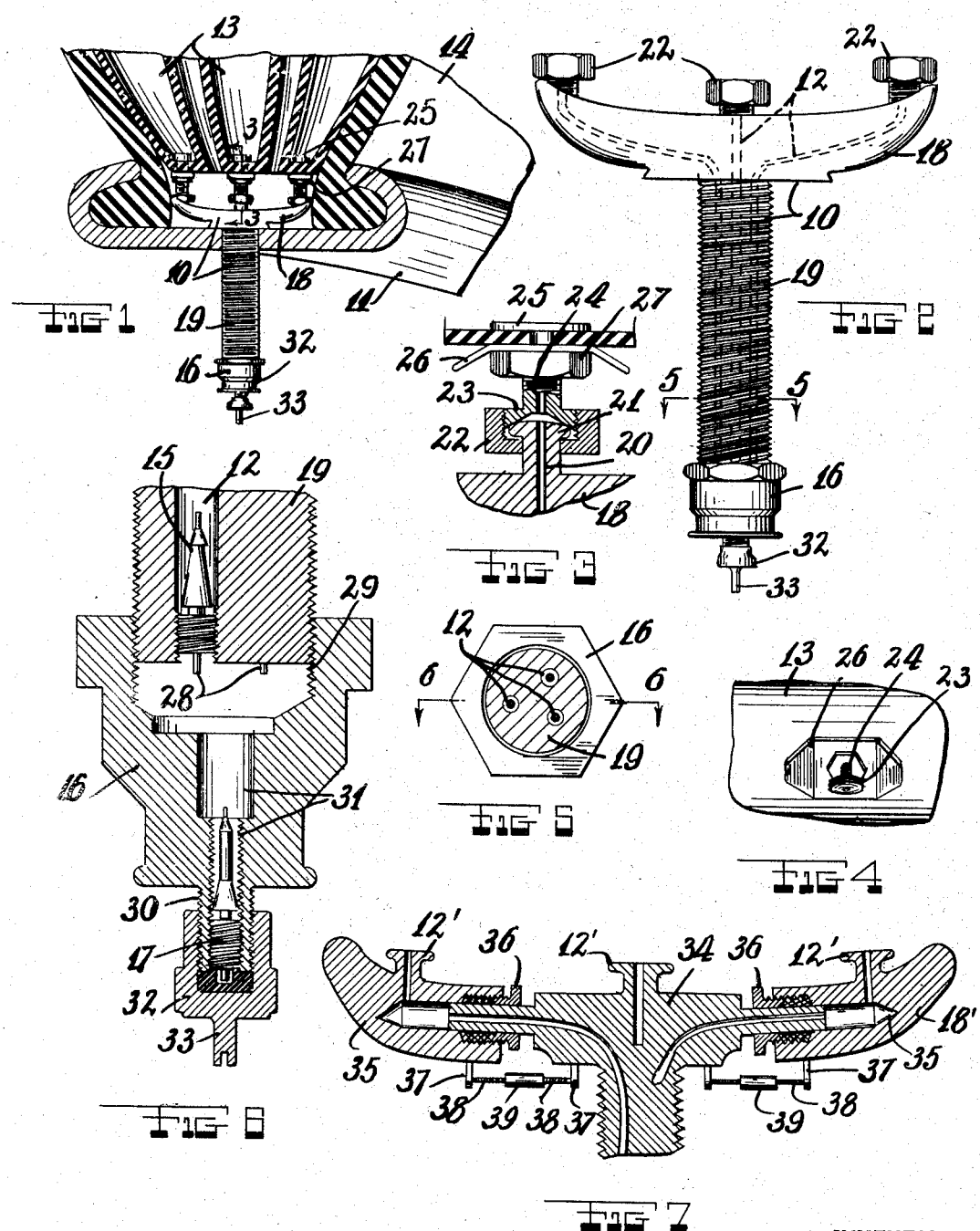

1,788,334

UNITED STATES PATENT OFFICE

LILLIAN SCHNEIDER AND AARON REICH, OF BROOKLYN, NEW YORK

MULTIPLE VALVE FOR SECTIONAL TUBES OF VEHICLE TIRES

Application filed November 20, 1929. Serial No. 408,451.

This invention relates to new and useful improvements in a tire valve.

This invention relates to similar subject matter as that disclosed in our copending application.

The invention has for an object the provision of a device of the class mentioned which is of simple durable construction, dependable in use and efficient in action, and which can be manufactured and sold at a reasonable cost.

The invention proposes a body member for engagement on the felloe of a wheel and formed with a plurality of passages, means for connecting one of the ends respectively of each of the passages with individual sections of a compound inner tube, a valve in the free ends of said passages, a member covering all of said valves, and a master valve in said member for controlling the passage of air to said valves.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a fragmentary sectional perspective view of the tire valve shown applied.

Fig. 2 is a side elevational detailed view of the valve, per se.

Fig. 3 is an enlarged detailed fragmentary sectional view taken on the line 3—3 of Fig. 1.

Fig. 4 is a fragmentary perspective view of a portion of one of the inner tubes shown in Fig. 1, and illustrated without the tire valve.

Fig. 5 is a horizontal sectional view taken on the line 5—5 of Fig. 2.

Fig. 6 is an enlarged fragmentary vertical sectional view taken on the line 6—6 of Fig. 5.

Fig. 7 is a fragmentary vertical sectional view of a tire valve constructed according to modified form.

The tire valve consists of a body member 10 for engagement on the felloe 11 of a wheel and formed with a plurality of passages 12, means for connecting one of the ends respectively of each of the passages with individual sections 13 of a compound inner tube engaged within a tire shoe 14 mounted upon the felloe 11, a valve 15 in each of the free ends of the said passages 12, a member 16 covering all of said valves 15, and a master valve 17 in said member 16 for controlling the passage of air to the valves 15.

The said body member 10 consists of a transverse head-forming portion 18 for engaging upon the outside of the said felloe 11 and a stem portion 19 connected with the head-forming portion and for engaging thru said felloe and the rim of a wheel upon which said felloe engages. The tire valve is shown constructed for accommodating an inner tube composed of three sections though this is not intended as a limitation since any number may be used. The number of passages 12 correspond with the number of tube sections, that is, as illustrated, three passages have been shown. The passages 12 pass from the head-forming portion 18 thru the stem 19.

The means for connecting one of the ends respectively of each of the passages 12 with the individual sections of the compound inner tube consists of a tubular projection 20 on the head-forming portion 18 for each of the passages 12 and a head portion 21 upon each of the tubular projections. A nut 22 is rotatively mounted upon each of the tubular projections and is adapted for threadedly engaging over the enlarged end 23 of a hollow stem 24 attached upon the inner tube section. At the inner end this stem is provided with a head portion 25, and a clamp plate 26 being mounted upon the stem adjacent the outer side of the inner tube section and a nut 27 firmly holds the clamp plate down and thus holds the parts in place.

The said valves 15 are of conventional design as used on tires. Each of the valves is provided with a depressible wire stem 28 for opening the valve and allowing the escape of air from within the tube. The member 16 is formed with internal threads 29 engaging upon external threads formed on the stem 19, and is also formed with a reduced free end 30. A central passage 31 extends thru the said member 16 and a portion of said passage is threaded for receiving the master valve 17. A small cap 32 is threadedly engaged upon the reduced free end 30 and serves to hold air within the tube against possible leakage passed the valves. This cap 32 is formed with a turning tool end 33 as is customary.

In operation, each of the passages within the body member is coupled with the individual tube sections 13 by rotation of the nuts 22. The tire may be inflated by the removal of the cap 32 and the connection of an air hose with the reduced end 30. The air hose is arranged with a means for depressing the wire stem of the valve 17 so that the incoming air may enter. The springs within the valve 15 are so designed that the valves automatically open upon pressure from the incoming air and thus the tube sections are inflated. Any or all of the tube sections may be deflated upon the removal of the member 16 and the depressing of the wire stems 28.

In the modified form of the device illustrated in Fig. 7, a means has been shown for adjusting the distances between the passages 12' for accommodating a compound tire with different sized inner tube sections. The tire valve is shown with a transverse head-forming portion 18' consisting of three sections namely a center section 34 and end sections 35. The center section is formed with reduced ends telescopically engaging in openings formed in the end sections.

Packing glands 36 and packing is arranged upon the reduced ends and upon the end sections for providing an air tight connection between the sections. A means is provided for holding the end sections at various adjusted positions relative to the central section. This means consists of lugs 37 projecting from the end sections and the central section, threaded rods 38 projecting from the lugs and a collar 39 threadedly engaging a pair of the rods 38 from the central section and an end section. The rods of this pair are formed with threads of opposite hand so that upon rotation of the collar the sections are drawn together or moved apart.

While we have shown and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Letters Patent is:—

1. A tire valve, comprising a body member for engagement on the felloe of a wheel and formed with a plurality of passages, means for connecting one of the ends respectively of each of the passages with individual sections of a compound inner tube arranged for providing adjustments for adjusting the distances between the inner ends of said passages for accommodating a compound tire with different sized inner tubes.

2. A tire valve, comprising a body member for engagement on the felloe of a wheel and formed with a plurality of passages, means for connecting one of the ends respectively of each of the passages with individual sections of a compound inner tube arranged for providing adjustments for adjusting the distances between the inner ends of said passages for accommodating a compound tire with different sized inner tubes, the air tight connections between the sections of the body member consisting of packing glands arranged on telescoping portions of the body section.

3. A tire valve, comprising a body member consisting of a central section and end sections, air passages formed in each section, and means for adjusting the distances between the said air passages for accommodating a compound tire with different sized inner tubes comprising elongated reduced ends on the central section telescopically engageable in openings in the end section, packing glands arranged on the telescoping portions of the sections to provide air tight connections, and means for holding the end sections at various adjusted positions relative to the central section.

4. A tire valve, comprising a body member consisting of a central section and end sections, air passages formed in each section, and means for adjusting the distances between the said air passages for accommodating a compound tire with different sized inner tubes comprising elongated reduced ends on the central section telescopically engageable in openings in the end sections, packing glands arranged on the telescoping portions of the sections to provide air tight connections, and means for holding the end sections at various adjusted positions relative to the central section, comprising lugs projecting from the end sections and the central section, threaded rods projecting from the lugs, and collars threadedly engaging the said rods of the central and end sections.

In testimony whereof we have affixed our signatures.

LILLIAN SCHNEIDER.
AARON REICH.